United States Patent [19]

Ishizuki et al.

[11] Patent Number: 4,804,991
[45] Date of Patent: Feb. 14, 1989

[54] AUTO FOCUSING LIGHT DEVICE

[75] Inventors: Kenji Ishizuki, Tokyo; Nobuyoshi Hagiuda, Kawasaki; Norikazu Yokonuma; Yoshinari Hamanishi, both of Tokyo, all of Japan

[73] Assignee: Nikon Corporation, Tokyo, Japan

[21] Appl. No.: 188,703

[22] Filed: May 4, 1988

Related U.S. Application Data

[63] Continuation of Ser. No. 4,482, Jan. 20, 1987, abandoned.

[30] Foreign Application Priority Data

| Jan. 24, 1986 | [JP] | Japan | 61-13478 |
| Jan. 29, 1986 | [JP] | Japan | 61-17251 |
| Mar. 6, 1986 | [JP] | Japan | 61-49296 |
| Mar. 20, 1986 | [JP] | Japan | 61-63137 |
| Mar. 25, 1986 | [JP] | Japan | 61-66720 |

[51] Int. Cl.$^4$ .......................... G03B 3/00; G03B 15/05
[52] U.S. Cl. .................................. 354/403; 354/145.1; 354/418
[58] Field of Search ............... 354/403, 415, 418, 126, 354/127.1, 127.11, 127.12, 165, 145.1; 356/1, 4; 250/553, 201 AF, 201 PF, 349, 353

[56] References Cited

U.S. PATENT DOCUMENTS

| 3,936,187 | 2/1976 | Momose | 354/403 X |
| 4,065,778 | 12/1977 | Harvey | 354/403 |
| 4,575,211 | 3/1986 | Matsumura | 354/403 |
| 4,688,919 | 8/1987 | Ogawa et al. | 354/403 |
| 4,690,538 | 9/1987 | Matsui et al. | 354/403 |
| 4,740,806 | 4/1988 | Takehana | 354/403 |

FOREIGN PATENT DOCUMENTS 34313 2/1983 Japan ........................................ 356/1

Primary Examiner—W. B. Perkey
Attorney, Agent, or Firm—Shapiro and Shapiro

[57] ABSTRACT

An auto focusing light device detachably mounted on a camera has a plurality of photoelectric conversion elements arranged in a unidimensional direction and detects the focusing condition of a photographic lens in accordance with the output of the plurality of photoelectric conversion elements. The device comprises a plurality of light-emitting elements arranged in a unidimensional direction, and an optical projection system for projecting images of the plurality of light-emitting elements on an object in such a manner that the direction of arrangement of the images of the plurality of light-emitting elements is substantially perpendicular to the direction of arrangement of the plurality of photoelectric conversion elements.

28 Claims, 5 Drawing Sheets

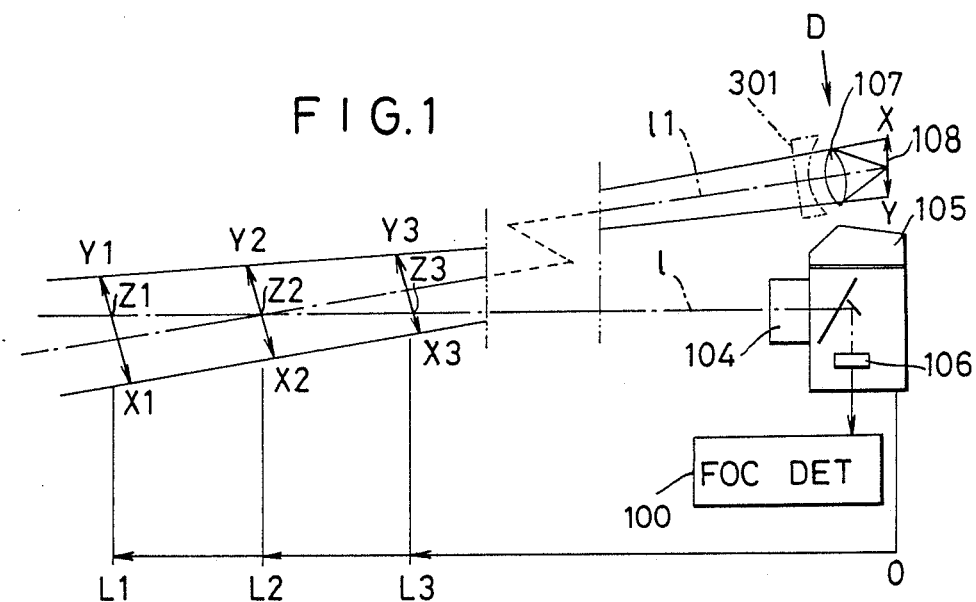
FIG.1
FIG.2A
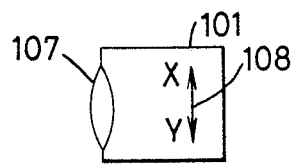
FIG.3A
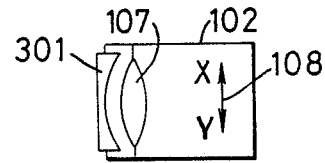
FIG.2B
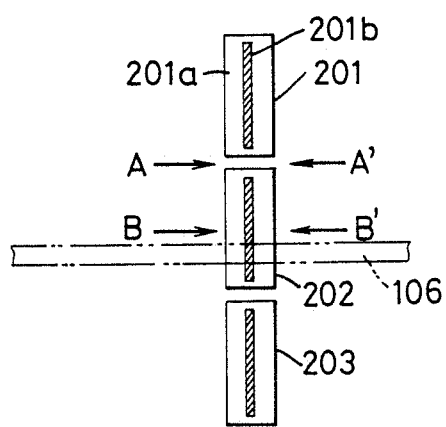
FIG.3B
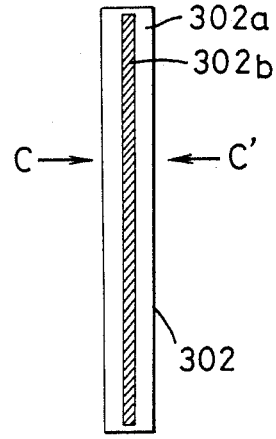

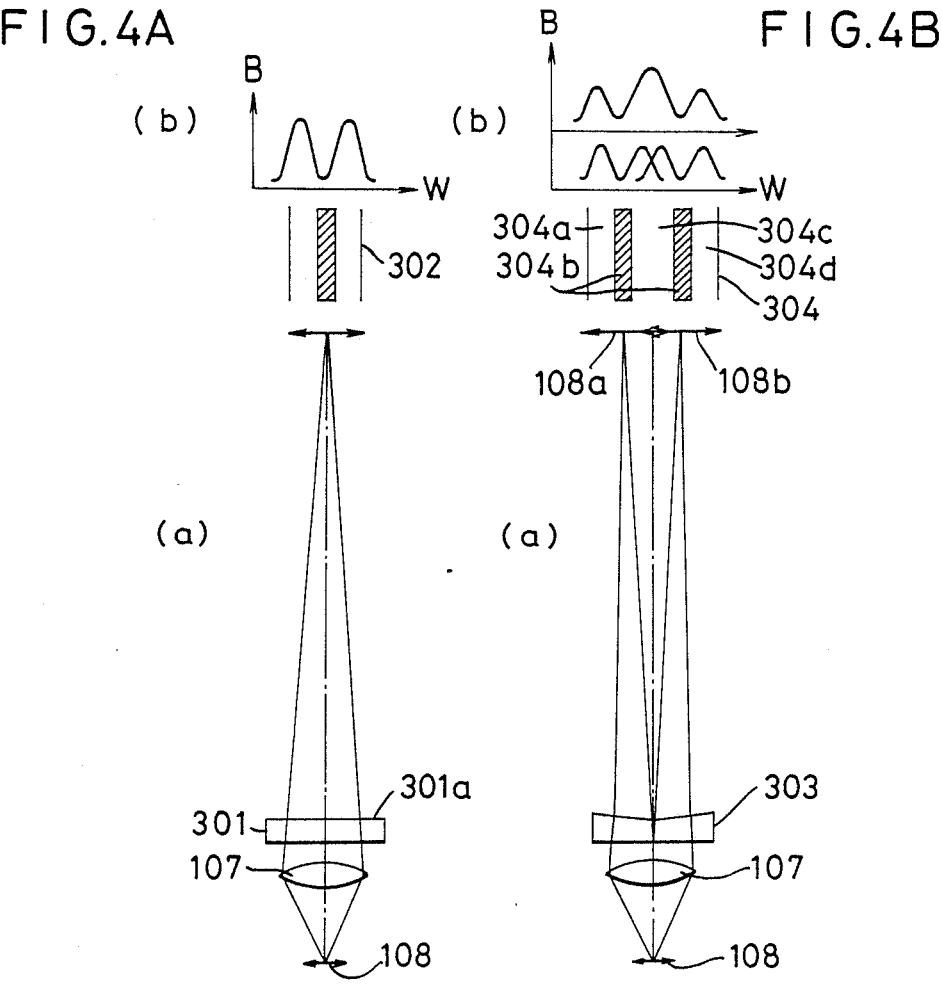

AUTO FOCUSING LIGHT DEVICE

This is a continuation application of Ser. No. 004,482, filed Jan. 20, 1987, now abandoned.

BACKGROUND OF THE INVENTION

1. Field of the Invention

The present invention relates to an auto focusing light device for use with an auto focus detecting device for a TTL camera.

2. Related Background Art

A photoelectric conversion element array of an auto focus detecting device for a TTL camera is normally disposed unidimensionally at a position optically equivalent to the vicinity of the center of a film (in the vicinity of the optical axis of a lens) in the longitudinal direction of the film. To guide the object light into the element array, the object light which has been transmitted through the lens is conventionally guided via a semi-transmissive portion of a main mirror and a supplementary mirror, or via a reflecting mirror.

In detection of the focus by the auto focus detecting device of a camera, no problem is presented when the object is of adequate brightness. However, if the object is dark, the focus detection time may become extremely long, or detection of the focus may become impossible.

SUMMARY OF THE INVENTION

Accordingly, an object of the present invention is to provide an auto focusing light device which has a simple arrangement and makes it possible to effect the detection of focus with high precision by projecting a specific projection pattern on an object.

To this end, the present invention provides an auto focusing light device in a system for detecting a focus condition of a lens according to the outputs of a plurality of photoelectric conversion elements arranged in a unidimensional direction, the device comprising a plurality of light-emitting elements arranged in a unidimensional direction and an optical projection system for projecting images of the plurality of light-emitting elements on an object in such a manner that the direction of arrangement of the images of the plurality of light-emitting elements is substantially perpendicular to the direction of arrangement of the plurality of photoelectric conversion elements.

BRIEF DESCRIPTION OF THE DRAWINGS

FIG. 1 is a schematic diagram illustrating the basic principle of an auto focusing light device in accordance with the present invention;

FIGS. 2A and 2B are schematic diagrams illustrating an outline of the device of the present invention;

FIGS. 3A and 3B are schematic diagrams illustrating an outline of an example of an improved device in accordance with the present invention;

FIGS. 4A, 4B, and 5 are schematic diagrams illustrating outlines of other examples of improved devices in accordance with the present invention;

DESCRIPTION OF THE PREFERRED EMBODIMENTS

Figure 6:
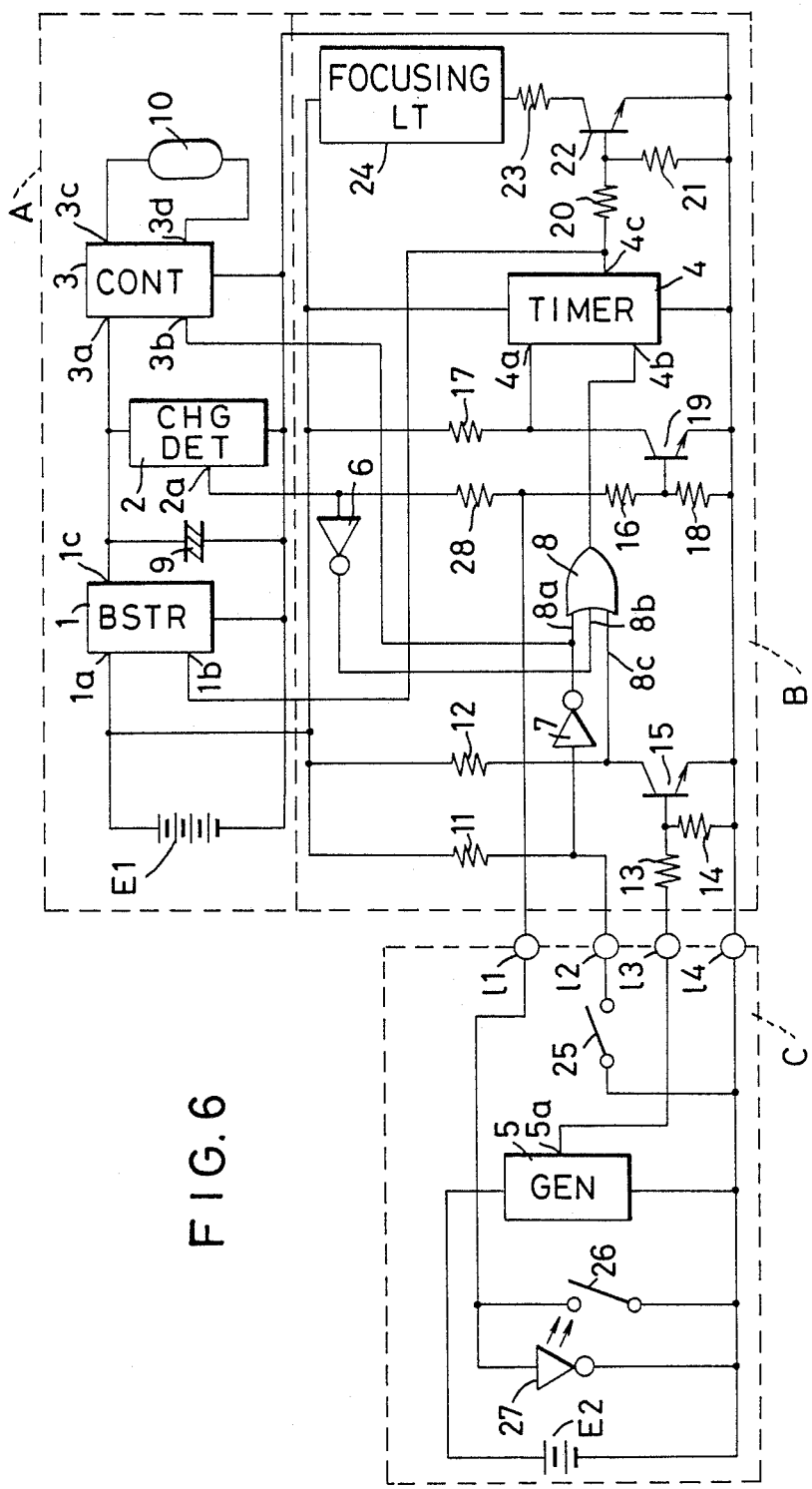
FIG. 6 is a diagram illustrating a circuit of the device of the present invention.

FIG. 1 is an explanatory diagram illustrating the relationship between the optical axis of a photographic lens and the light projected from an auto focusing light device. In FIG. 1, a single reflex camera 105 has a photoelectric conversion element array 106 for auto focus detection at the bottom of its body, and is arranged such as to guide an image of an object incident upon a photographic lens 104 capable of an auto focusing operation to the element array 106 via a reflecting mirror, and focus detection processing is effected by an auto focus detecting device 100. At that time, when the object is darker than a predetermined amount of light, and the focus detection processing of the auto focus detecting device 100 fails to operate properly, a focus-detecting projection pattern 108 is projected via a projection lens 107 onto the object from an auto focusing light device incorporated in an electronic flash device mounted on the camera 105. An arrangement may be provided for automatically detecting at that juncture whether or not the object has the predetermined amount of brightness using the photoelectric conversion element array of the auto focus detecting device, thereby to automatically operate the auto focusing light device. Alternatively, an arrangement may be provided for displaying on a viewfinder or the like the fact that the object is dark, thereby informing the user of the advisability of effecting a manual operation. The projection pattern 108 is arranged by light-emitting diodes LEDs, and if the projected image is projected on the element array 106, the projected image is projected as an image elongated in the direction perpendicular to the direction of the arrangement of the element array 106. FIG. 1 shows that, when the projection pattern 108 (X—Y) is projected by the auto focusing light device, the projection pattern incident upon the element array 106 varies depending on the relationship between the projected pattern 108 and the optical axis of the photographic lens 104 in accordance with the distance of the object. In other words, it can be seen that, when the distance of the object is L1, the light at a point of intersection Z1 of the projection pattern 108 (X1—Y1) is mainly made incident upon the element array 106, that, similarly, when said distance is L2, the light at a point of intersection Z2 of the projection pattern 108 (X2—Y2) is mainly made incident upon the element array 106, and that, similarly, when said distance is L3, the light at a point of intersection Z3 of the projection pattern 108 (X3—Y3) is mainly made incident upon element array 106. The auto focus detecting device incorporated in the camera detects the image of this projection pattern 108, thereby making it possible to effect detection of the focus even if the object is dark.

The arrangement of this auto focusing light device will now be described with reference to FIGS. 2A, 2B, 3A, and 3B.

In the auto focusing light device, the projection pattern 108 is formed by arranging a plurality of LED chips in a row. With the plurality of LED chips thus arranged, an image of the projection pattern 108 is formed, extending in the direction perpendicular to the direction of the arrangement of the element array 106. However, if a unidirectionally elongated light-emitting diode LED which is not divided is provided instead of the aforementioned plurality of LED chips arranged in one direction, this arrangement entails difficulties in production and result in reduced yield and higher cost, so that such an arrangement is not suitable for practical purposes. For this reason, it is preferable to arrange a plurality of LED chips to form the projection pattern 108.

A light focusing light device 101 as shown in FIG. 2A has the projection lens 107 disposed in front of the projection pattern 108. If the projection pattern 108 is projected on the object using this auto focusing light device 101, projected images 201, 202, 203 of the plurality of LED chips are projected as they are on the object in a state in which they are arranged in one direction. Each of the LED chips has an electrode formed of a metallic film in the center thereof, so that the central portion thereof is dark, while the surrounding portion of the electrode becomes bright. Then, the projected images of the LED chips are projected on the object in the form of bright portions 201a and dark portions 201b. In other words, the projected images 201, 202, 203 are projected on the element array 106 in the direction (in the vertical direction in the drawing) perpendicular to the direction of the arrangement (in the horizontal direction in the drawing) thereof via the photographic lens 104. The auto focus detecting device of the camera detects images of this projection pattern (projected images 201, 202, 203) and effects a known auto focusing operation.

Accordingly, it becomes possible to effect auto focus detection with respect to a dark object by a simple projection method in which the LED chips are directly used for obtaining projected images by means of the projection lens 107. Furthermore, since the configurations of the plurality of the LED chips are projected directly, the auto focusing light device has a simple arrangement and is advantageous in terms of cost as well.

When an auto focusing operation is carried out using the auto focusing light device since the object is dark, if a portion where the optical axis of the photographic lens 104 intersects the projection pattern 108 coincides with a portion indicated by B—B' in FIG. 2B (for instance, in the case of the distance of the object L2 in FIG. 1), the projected image 202 enters the element array 106 as reflected light incident upon the same. Hence, it is possible to properly effect the auto focusing operation. However, if the portion where the optical axis of the photographic lens 104 intersects the projection pattern 108 coincides with a portion indicated by A—A' in FIG. 2B (for instance, in the case of the object of the distance L1 in FIG. 1), there is a possibility that a situation may occur which makes it impossible to effect a proper auto focusing operation since the light which does not have the projected images 201 and 202 enter the element array 106 as reflected light. An example of an improved auto focusing light device which overcomes such a drawback is shown in FIGS. 3A and 3B.

An auto focusing light device as shown in 3A has a projection lens 107 and a cylindrical lens 301 disposed in front of the projection pattern 108. This cylindrical lens 301 may be disposed in either the front or the rear of the projection lens 107. In this auto focusing light device 102, if the projected pattern 108 is projected, the projected images 201, 202, 203 of the plurality of LED chips shown in FIG. 2A are enlarged with their joints overlapping on each other on the object by means of the cylindrical lens 301, and one projected image 302 is formed and projected, as shown in FIG. 3B. In other words, the projected images of the LED chips are projected on the object in the form of a bright portion 302a and a dark portion 302b, as shown in FIG. 3B, and the projected image 302 is projected on the element array 106 in the direction perpendicular to the direction of the arrangement thereof via the photographic lens 104. The auto focus detecting device of the camera detects the projected image 302 and effects a known auto focusing operation. Thus, if an auto focusing operation is carried out using the auto focusing light device 102 since the object is dark, the portion where the optical axis of the photographic lens 104 intersects the projected pattern 108 coincides with a portion indicated by C—C'. Hence, since the projected image 302 is made incident upon the element array 106 as reflected light, it becomes possible to properly effect an auto focusing operation.

In the embodiments shown in FIGS. 2A, 2B, 3A, and 3B, there is a problem in that the auto focus detecting operation may be affected depending on whether the photographic lens 104 is a wideangle lens or telephoto lens. This is attributable to the fact that, in both of the aforementioned embodiments, if the photographic lens 104 is changed from a standard lens to a wideangle lens, the magnification becomes small, so that the width of the image of the projection pattern projected on the element array 106 becomes narrow. Consequently, a situation occurs in which the projection pattern cannot be detected by the element array 106 due to the relationship between the width of the image of the projection pattern and the intervals of the elements of the element array 106, and, hence, a situation occurs in which the focus cannot be detected. To overcome this problem, it is conceivable to widen the width of the LED chips and provide an additional LED chip array in parallel. However, both of these measures cannot possibly be realized since the price of LED chips is high, which results in increased burden in cost in the present situation. Therefore, description will now be made of a method of increasing the transverse width of the projection pattern in a simple arrangement without increasing the number of the LED chips.

FIG. 4A(a) is an explanatory diagram of the aforementioned projection lens 107 and cylindrical lens 301 as viewed from the arrow D in FIG. 1. FIG. 4A(b) shows the distribution of luminous intensity of the projected image 302 of the projection pattern 108. The vertical axis shows brightness B, while the horizontal axis shows the width of the image W.

A cylindrical lens 303 shown in FIG. 4B(a) is an improved example in which wedge-shaped prisms are formed on a flat surface side 301a of the cylindrical lens 301 shown in FIG. 4A(a) to increase the width of the projected image 302. FIG. 4B(b) shows the distribution of luminous intensity of a projected image 304 projected by the wedge-shaped prism. If the cylindrical lens 303 is thus designed, two projection patterns 108 are projected by a refractive index n of the prism, thereby forming the projected image 304, as shown in FIG. 4B(a). This cylindrical lens 303 enlarges the width of the projection pattern 108 in the direction of the arrangement of the element array 106 by means of the function of the cylindrical lens, in a manner similar to that of the aforementioned embodiment, and, further, projects the projection pattern in two rows in the direction of the arrangement of the element array 106 by virtue of the function of the prism. Thus, the wedge-shaped prism is formed on the flat surface side of the cylindrical lens in such a manner as to project the projection pattern 108 in two or a plurality of rows in the direction of the arrangement of the element array 106. A bright portion 304a, a dark portion 304b, a bright portion 304c, a dark portion 304b, and a bright portion 304d are formed alternately in this projected image 304 in the direction of the arrangement of the element array 106. Although the quantity of light decreases by half in respective portions in comparison with the projected image 302, the quantity of light and the width of the projected image increases at the bright portion 304c where portions of the projected image partially overlap each other. By forming the projected image 304 in this manner, the width of the projected image of the projection pattern 108 is increased, and the contrast of the projected image is emphasized alternately by the bright, dark, bright, dark, and bright portions. Consequently, even if a wideangle lens is mounted, a situation is eliminated in which the detection of focus by the auto focus detecting device is impossible. In addition, this arrangement is advantageous in terms of cost since the cylindrical lens 303 is used in which the cylindrical lens 301 and the prism are formed integrally. Incidentally, this third embodiment should not be restricted to the arrangement in which the wedge-shaped prism and the cylindrical lens are formed integrally, and these component parts may be arranged independently. In addition, the light-emitting diodes constituting the projection pattern should not be restricted to the plural number, and a single light-emitting diode may be used.

Detailed description will be made hereafter of this cylindrical lens 303 of the prism integral type. In FIG. 5, as for the projection image at an image-forming plane Z where the image of the projection pattern 108 is formed, an image-forming point is offset from Z2 to Z2' due to the action of a prism 303a, and a projected image 108a shown in FIG. 4B(a) is formed. Similarly, a projected image 108b is formed by means of a prism 303b disposed symmetrically with the prism 303a. The projected image 304 is comprised of the projected images 108a and 108b. These prisms 303a, 303b are determined as described below. An apex angle δ of the prism for forming the projected image 304 by overlapping the projected images of the projection pattern 108 can be determined from the following formula using an amount of offset S at the image-forming plane Z, a distance R, an angle of deflection σ, and the refractive index n of the cylindrical lens 303:

$$\sigma = \tan^{-1} (S/R) \quad (1)$$

$$\sigma = \sigma/(n - 1) = \frac{1}{n-1} \tan^{-1} \frac{S}{R} \quad (2)$$

Since the prisms 303a, 303b are thus determined, if the apex angle δ which allows an optimum projected image to be obtained is selected in accordance with the charcteristics of the auto focus detecting device located in the camera.

If the power source of the auto focusing light device and the power source of an electronic flashing device are made common, since the electronic flashing device emits flash light, the supply voltage is boosted and its output is charged in a capacitor (normally referred to a "main capacitor"). However, since this charging load is heavy, if the auto focusing light device is operated during the charging of the main capacitor, a sufficient power fails to be supplied from the power source, so that the illuminating power of the auto focusing light device becomes weak. In addition, it is conceivable that, if the auto focusing light device is used during the charging of the main capacitor, there will occur a problem that a longer time is required for charging in the main capacitor (a recycle time).

FIG. 6 shows a circuit diagram in a case where the electronic flashing device having the auto focusing light device of the present invention is connected to the camera. In FIG. 6, the electronic flashing device having a flash light circuit A and an auto focusing light driving circuit B is mounted on a camera C, and the camera C and the electronic flashing device are electrically connected to each other by means of signal lines 11-14. If the object is too dark to effect a focus detecting operation by the auto focus detecting device, a projected pattern is projected on the object from the auto focusing light driving circuit B of the electronic flashing device mounted on the camera, and an image of the projection pattern thus projected is detected by the auto focus detecting device.

The flash light circuit A includes a low-voltage power source E1, a booster 1 for boosting the power source E1, a main capacitor 9 charged by the booster 1, a charge detecting circuit 2 for monitoring the charged voltage of the main capacitor 9, a xenon pipe 10, a light controlling circuit 3 for controlling the light emitted by the xenon pipe 10.

The auto focusing light driving circuit B inludes signal lines 11-14 for electrically connecting the same to the camera C, a transistor 15 connected to the connecting line 13, an inverter 7 connected to the connecting line 12, a transistor 19 connected to the connecting line 11, an inverter 6 connected to an output line 2a of the charge detecting circuit 2 of the flash light circuit A, an OR circuit 8 having an input terminal to which the inverter 7, the inverter 6, and the emitter of the transistor 15 are connected, a timer 4 to which the output of the OR circuit 8 and the emitter of the transistor 19 are connected, a transistor 22 connected to the output line 4c of the timer 4, an LED 24 connected to the emitter of the transistor 22, and resistors 11-14, resistors 16-18, and resistors 20, 21, 23, 28.

The camera C includes the signal lines 11-14 for electrically connecting the same to the electronic flashing device, a power source E2, a signal generator 5 for outputting a signal indicating that a TTL automatic light adjusting circuit and the like are provided, a distance measuring start switch 26 for operating the auto focus detecting circuit, an x contact switch 25 for operating the flash light circuit A, and an LED 27 which indicates that the charging of the main capacitor 9 of the flash light circuit A has been completed.

Next, description will be made of the relationship between the circuit of the camera C and the flash light circuit A of the electronic flashing device.

When the low-voltage power source E1 is turned on, the booster 1 boosts the voltage of the low-voltage power source E1 connected to a power input line 1a. Also, the booster circuit 1 stops its boosting operation when a high level signal is input to a control signal input line 1b. The output of this booster 1 charges the main capacitor 9. The charged voltage of the main capacitor is monitored by the charge detecting circuit 2. When the charge voltage of the main capacitor 9 reaches a level greater than a charge completion voltage, the charge detecting circuit 2 outputs a high level signal (abbreviated as "HI") of a charge completion signal to an output line 2a thereof, thereby to turn on the LED 27, which is a ready lamp of the camera, via the signal line 11 connected to the camera. The LED 27 of the ready lamp is located in, for instance, the viewfinder of the camera, and is adapted to inform the operator of the completion of charging of the electronic flashing device. Meanwhile, the charge detecting circuit 2 outputs a low level signal (abbreviated as "LO") to the output line 2a at times other than the completion of charging. The light controlling circuit 3, with the main capacitor 9 connected to an input line 3a thereof, outputs a charge accumulated in the main capacitor 9 to the xenon pipe 10 via an output line 3c during flashing. When the X contact 25 is closed in an interlinking relationship with a release button of the camera with the charging of the main capacitor 9 completed, the X contact line 12 is set to "LO", while the output of the inverter 7 is set to "HI". This signal is input to a light starting signal input line 3b of the light controlling circuit 3 as a light starting signal. When this signal is input, the light controlling circuit 3 discharges the charge of the main capacitor 9 to the xenon pipe 10 connected to the output lines 3c, 3d, thereby starting the emission of the light.

Next, description will be made of the relationship between the camera C and the flash light circuit A on the one hand, and the auto focusing light driving circuit B on the other. When the power source E1 is supplied to the electronic flashing device, the charging of the main capacitor 9 is started by the booster 1. The output line 2a of the charge detecting circuit 2 outputs "LO" until completion of the charging of the main capacitor 9. The output of "LO" by the charge detecting circuit 2 keeps the LED 27 unlit via the signal line 11, and sets the output of the inverter 6 to "HI". The output of the inverter 6 is connected to the input line 8b of the OR circuit 8, and "HI" is input to the OR circuit 8. Consequently, the OR circuit 8 outputs "HI" to a reset input line 4b of the timer 4. Since the reset input is "HI", the timer 4 is reset, stops its timing operation while the reset input is set to "HI", and outputs "LO" to an output line 4c. Since this output line 4c is set to "LO", the transistor 22 is off, so that the auto focusing light 24 composed of the plurality of LEDs is unlit.

On completion of the charging of the main capacitor 9, the output line 2a of the charge detecting circuit 2 outputs "HI", while the output of the inverter 6 becomes "LO". In this state, in cases where the power source E2 of the camera is not turned on, and in the case of a camera which is not provided with the signal generating circuit 5, "LO" is output from the signal line 13 to the auto focusing light driving circuit B, so that the transistor 15 is turned off, while "HI" is input to an input line 8c of the OR circuit 8, and the timer 4 is reset. At that time, the output line 4c of the timer 4 continues to output "LO" to keep the transistor 22 off, thereby continuing to inhibit the turning on of the auto focusing light 24. On the other hand, in cases where the power source E2 of the camera C provided with the auto focus detecting device and the signal generating circuit 5 has been turned on, an output line 5a of the signal generating circuit 5 outputs "HI" to the signal line 13. The transistor 15 is thereby turned on, and the input line 8c of the OR circuit 8 is set to "LO". At that time, if the X contact 25 of the camera is open (the camera is not being released), the input of the inverter 7 becomes "HI", and the inverter 7 outputs "LO" to the input line 8a of the OR circuit 8. Furthermore, since the charging of the main capacitor has been completed, as described above, the charge detecting circuit 2 outputs "HI" from its output line 2a and outputs "LO" to the input line 8b of the OR circuit 8. When these conditions are satisfied, all of the three input lines 8a to 8c of the OR circuit assume "LO", thereby cancelling the reset of the timer 4.

In this state, the distance measuring start switch 26 is closed, and the auto focus detecting device of the camera starts its operation. As a result, the signal line 11 assumes "LO", and the transistor 19 is turned off. Consequently, "HI" is input to the input line 4a of the timer 4. Since the reset of the reset input line 4b of the timer 4 has already been cancelled by "LO", as described above, the timer 4 starts timing from the moment of rise when "HI" is input to the input line 4a, and outputs "HI" to the output line 4c for a fixed time. This output is output to the base of the transistor 22, which, in turn, turns on the transistor 22, thereby lighting the auto focusing light 24 for a time set by the timer 4.

Also, the output line 4c of the timer is connected to the control signal input line 1b of the booster 1 and temporarily stops the boosting operation of the booster during the timing operation of the timer 4, i.e., while the auto focusing light 24 is lit, so as to alleviate the load of the power source E1 caused by boosting, thereby allowing a sufficient power to be supplied to the auto focusing light driving circuit B.

During timing by the timer 4, i.e., while the auto focusing light 24 is being lit, if the camera is released and the X contact 25 is closed, the input of the inverter 7 becomes "LO" via the signal line 12. Then, "HI" is input to the input line 8a of the OR circuit 8. The OR circuit 8 outputs "HI" to the reset input line 4b of the timer 4. Consequently, the timer 4 is reset, and the illumination of the auto focusing light 24 is turned off. In addition, since the inverter 7 assumes "HI", "HI" is input to the light starting input line 3b of the light controlling circuit 3, thereby starting the emission of light.

The timer 4 is adapted to start timing in synchronization with the rise of the signal input to the input line 4a for the start of timing. However, if the counting time is made longer than the time required for measuring of the distance by the AF device of the camera, it becomes possible to continuously light the auto focusing light 24 even if several measurements of the distance are required until the focusing by the AF device is obtained.

While the auto focusing light 24 is being lit upon actuation of the timer, as described above, the distance measuring operation by the AF device of the camera is completed. Also, when illumination by the auto focusing light becomes unnecessary, if the signal output to the signal line 13 from the signal generating circuit 5 of the camera is set to "LO", the transistor 15 is turned off, the input line 8c of the OR circuit 8 is set to "HI", and the OR circuit 8 outputs "HI" to the reset input line 4b of the timer 4. Consequently, the timer 4 is reset, thereby making it possible to turn off the auto focusing light 24. To set the output of the this signal line 13 to "LO", a transistor switch may be inserted between, for instance, the signal lines 13 and 14, and this transistor switch may be turned on by a control circuit (not shown).

Incidentally, although, in this embodiment, when a releasing operation is carried out while the auto focusing light 24 is being lit, the auto focusing light 24 is turned off by detecting the closing of the X contact 25 of the camera. However, the auto focusing light 24 may be turned off by making use of another signal preceding the closing of the X contact in synchronization with the releasing operation, for example, a mirror-up signal and a front curtain run start signal. In the embodiment, although an electronic switch such as a transistor is used for the distance measuring start switch 26, the switch 26 is indicated by the code of a switch in the drawing.

As described above, since the auto focusing light 24 is lit upon completion of the charging of the main capacitor, i.e., after the load of charging has been alleviated, this arrangement has an advantage in that a sufficient power can be supplied to the auto focusing light 24.

In addition, there is another advantage in that, since the illumination of the auto focusing light is made possible only when the output of the signal from the signal generating circuit 5 of the camera is being output, the camera is capable of controlling the output from the signal generating circuit 5, so that the turning on and off of the auto focusing light can be controlled freely. Moreover, since the period of lighting of the auto focusing light 24 is set by the timer in such a manner that a sufficient focus detecting operation can be effected, an arrangement is made such that the auto focusing light 24 will not be used wastefully when the focus detecting operation by the auto focus detecting device is not completed during this predetermined period, i.e., when the detection of focus is impossible, thereby preventing wasteful consumption of the power.

Figure 7:
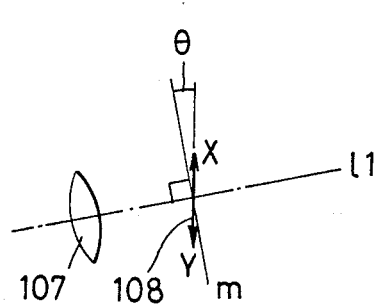
FIGS. 7 and 8 are schematic diagrams both illustrating a part of the function of the device of the present invention.

As shown in FIG. 7, the auto focusing light device of the present invention has the projection lens 107 disposed in front of the projection pattern 108. The optical axis of this projection lens 107 is inclined by a predetermined angle relative to the optical axis of the photographic lens 104. The projection pattern 108 is disposed in a plane which is inclined by a certain angle $\theta$ from a plane m perpendicular to the optical axis 11 of the projection lens 107. Since the projection pattern 108 is thus arranged, the optical path from the projection lens 107 to the LED chip 203 (the Y side) of the projection pattern 108 is shorter than the optical path from the projection lens 107 to the LED chip 201 (the X side) thereof. Therefore, the projected image of the LED chip 203 (on the Y1–Y3 side) is formed at a position farther from the photographic lens 104 than the projected image of the LED chip 201 (the X1–X3 side). Accordingly, since the image of the projected pattern is formed on the object in such a manner as to be inclined by a certain angle relative to the projection pattern 108, the image of the projection pattern is formed without becoming out of focus as long as it is on the optical axis 1. Accordingly, when comparison is made between an image of the projection pattern formed, for instance, only on the plane perpendicular to the optical axis 1 and the image of the projection pattern in accordance with the present device, the range of the image of the projection pattern in accordance with the present device formed on the object in the direction along the optical axis 1 becomes wider, thereby functioning effectively in the detection of focus.

Figure 8:
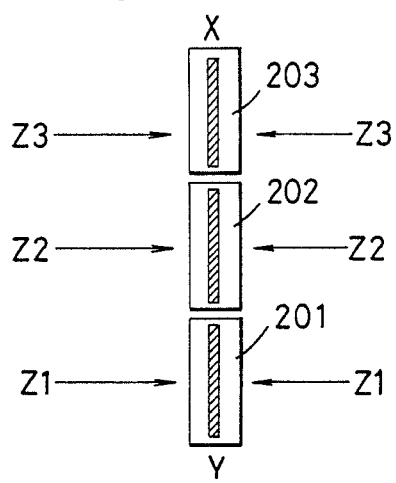

If an image of the projection pattern 108 is formed on the object using this auto focusing light device, the plurality of the LED chips 201, 202, 203 aligned in one direction are projected on the object as they are, as shown in FIG. 8.

As can be seen from FIG. 1, as for this projection pattern 108, portions of the LED chips intersecting the optical axis 1 of the photographic lens 104 differ depending on the object distance. In other words, at the far distance L1, the optical axis 1 intersects the image of the LED chip 201; at the intermediate distance L2, it intersects the image of the LED chip 202; and at the near distance L3, it intersects the image of the LED chip 203. Generally speaking, if the illuminance of the projection pattern is uniform, even if a projection pattern of a sufficient degree of illumination can be obtained at the intermediate distance, a projection pattern of an excessive degree of illumination is obtained at the near distance, resulting in wasteful consumption of power consumption. At the far distance, only a projection of an insufficient degree of illumination is obtained, which is unsuitable for the detection of focus.

As can be seen from FIG. 1, the LED chip 201 of the projection pattern 108 is made incident upon the photoelectric conversion element array 106 for detection of the focus when the object is located at the long distance L1, while the LED chip 203 is made incident upon the photoelectric conversion element array 106 for detection of the focus when the object is located at the near distance L3. Accordingly, it can be seen that, to allow the auto focus detecting device to effect the focus detection, the illumination of the projection pattern on the object must be sufficient even at the long distance L1, so that a large electric current is required for the LED chip 201 corresponding to the long distance L1. On the other hand, it can also be seen that a small electric current suffices for the LED chip 203 corresponding to the near distance L3 if a sufficient degree of illumination can be obtained.

Figure 9:
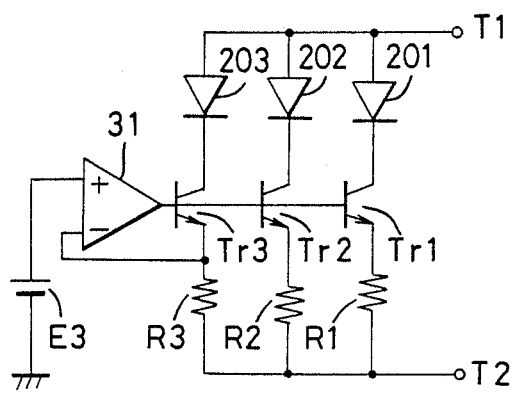
FIG. 9 is a circuit of the device of the present invention for attaining a part of the function shown in FIGS. 7 and 8.

FIG. 9 shows a circuit of the auto focusing light 24 shown in FIG. 7. The circuit for driving and controlling this projection pattern 108 is adapted to allow electric currents having different current values to flow to the LED chips 201–203. LED chips 201–203, transistors Tr1–Tr3, and resistors R1–R3 form a serial circuit in which they are connected in series. A terminal T1 thereof is connected to one end of the resistor 11, while a terminal T2 thereof is connected to one end of the resistor 23. The bases of these transistors Tr1–Tr3 are connected to the output terminal of an OP amplifier 31. This OP amplifier 31 has its non-invertivle input terminal connected to a reference potential E3 for setting a constant current. Resistance values [R1], [R2], and [R3] of these resistances R1–R3 are arranged in the order of [R3]>[R2]>[R1]. Consequently, as for the gradient of electric currents supplied to the LED chips 201–203, the current value flowing to the LED chip 201 is the largest, less large current values being those of the LED chips 202, 203 in that order. Accordingly, as for the projection pattern 108, the degree of illuminance of the LED chip 201 is the highest, followed by the LED chips 202, 203 in that order.

Figure 10:
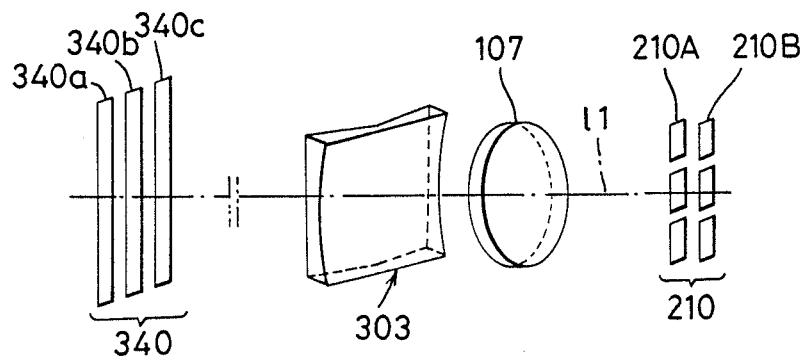
FIG. 10 is a schematic diagram illustrating still another example of an improved device in accordance with the present invention.

Description will now be made of the optical characteristics of the cylindrical lens 303 of the auto focusing light device of this invention. Although one row of the LEDs 201 to 203 is provided in the aforementioned embodiments, in the example shown in FIG. 10 two LED arrays respectively constituted by three LED elements are arranged. The object lens 107 of this optical system for detecting a projected pattern may be placed in the front or the rear of the cylindrical lens 303. Also, an arrangement is made such that three rows of an image 34 of the projection pattern are formed by horizontally offsetting the projected images of the two LED arrays 210A, 210B by means of the wedge-shaped prism formed on the flat surface-side of the cylindrical lens 303. In other words, as shown in FIG. 10, the image of the LED array 210A is projected in the form of, for instance, projected images 340a, 340b by virtue of the action of the prism. Similarly, the image of the LED array 210B is projected in the form of, for instance, projected images 340b, 340c by virtue of the action of the prisms. The projected image 340b is formed as a result of overlapping of the projected images of the LED arrays 210A, 210B. Thus, the three rows of images 340a–340c of the projection pattern are formed to facilitate the detection of focus by the auto focus detecting device.

Figure 11:
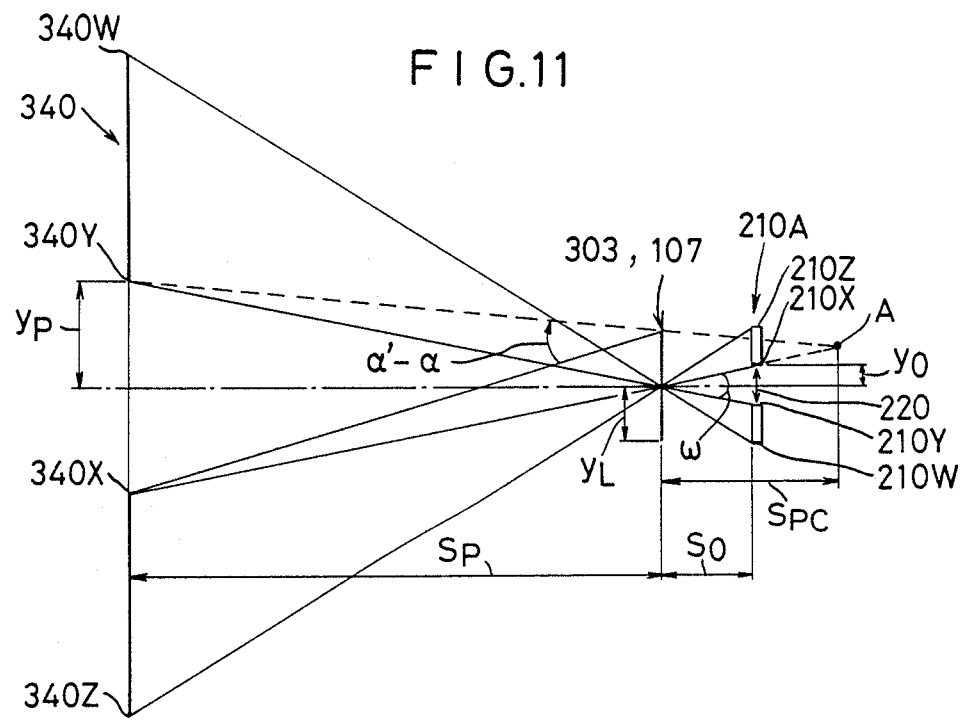
FIG. 11 is a schematic diagram illustrating the basic principle of an optical system employed in the device of the present invention shown in FIG. 3A.

FIG. 11 is an explanatory diagram in which the diagram of arrangement of the optical system shown in FIG. 10 is simplified as a vertical cross section, the LED array 210A being assumed to be constituted by two LED elements, and the pattern projection optical systems 107, 303 for focus detection being assumed to be an optical system having virtually no thickness. These optical pattern projection systems 107, 303 for focus detection are arranged such as to compensate for the projected image of a non-light-emitting portion the LED array 210A and to project the projected image of the LED elements (light-emitting portions) of the LED array 210A out of focus in such a manner that the image 340 of the projection pattern projected on the object becomes a continuously bright projected image. Description will now be made of the optimum performance of the pattern projection optical systems 107, 303 in terms of their arrangement.

For instance, if the optical pattern projection system has a positive refracting power, the LED element (210X-210Z) of the LED array 210A forms a projected image (340X-340Z) and the LED element (210Y-210W) thereof forms a projected image (340Y-340W), so that the space (340Y-340X) between the projected images becomes dark. Hence, the image of the projection pattern 340 fails to become a continuously bright projected image. Accordingly, in order to brighten the space (340Y-340X) between these projected images, the cylindrical lens 303 having a negative refracting power is disposed to deflect the light beams from the respective end portions 210X, 210Y of the LED elements (210X-210Z) and (210Y-210W) vertically as viewed in the drawing, i.e., the light beam from the end portion 210X is deflected from the end portion 340X to the end portion 340Y of the projected image, and the light beam from the end portion 210Y is deflected from the end portion 340Y to the end portion 340X of the projected image so as to brighten the portion (340Y-340X) between the projected images, thereby making the image 340 of the projection pattern a continuous bright pattern. To this end, the optical pattern projection systems 107, 303 may be arranged in such a manner that a virtual image A is formed by the end portion 210X, and the same holds true of the end portion 210Y.

For this reason, it suffices if the pattern projection optical systems meet the following conditional formula (3).

Generally, if it is assumed that an angle of incidence constituted by the optical axis of an incident paraxial ray is $\alpha$, an angle of emergence constituted by the optical axis of the incident paraxial ray is $\alpha'$, the focal length is f, and the height of incidence is h, we have $$\alpha' - \alpha = h/f \tag{3}$$

Accordingly, if the light beam from the end portion 210X of the LED element (210X-210Z) is made incident via the pattern projection optical systems, the angle of refraction of the light beam by the cylindrical lens 303 having as the angle of incidence upon the cylindrical lens 303 as its reference is $(\alpha' - \alpha)$, the focal length is f, and the height of incidence is h.

If an angle of viewing the non-light-emitting portion of the LED1 from the center of the projection lens 107 is assumed to be $\omega$, we have $$\omega \approx 2y_0/S_0$$

If this formula is rewritten by expressing $2y_O$ as $\delta$, we have $$\omega = \delta/S_0$$

where $\omega \approx \alpha' - \alpha$

In addition, the focal length f becomes the focal length of the cylindrical lens 303, and we have $$f = f_c$$

The height of incidence h is equivalent to the effective radius $y_L$ of the projection lens 107, and we have $$h = y_L$$

If the optical projection systems 107, 303 can be regarded as being of a thin-walled adhered type, $y_L$ is also equivalent to the effective radius of the cylindrical lens 303.

Accordingly, from the formula (3) we have $\delta/S_0 \approx y_L/f_c$, and it suffices if the optical pattern projection systems satisfy the following formula:

$$0.3 < \left| \frac{\delta \cdot f_c}{y_L \cdot S_0} \right| < 1 \tag{4}$$

where
 $\delta$: interval of the non-light-emitting portions of the light source
 $f_c$: focal length of a negative cylindrical lens
 $S_O$: distance from the principal point of the object lens to the light source
 $y_L$: effective radius of the object lens The upper limit of this formula (4) is determined in consideration of the fact that, should this upper limit be exceeded, the refracting power of the negative cylindrical lens is not sufficient, and the angle of deflection of the light beam of the LED element cannot be sufficient, so that the region (340Y-340X) corresponding to the projected image of the non-light-emitting portion 220 of the LED array 210A cannot be illuminated sufficiently, resulting in the failure in completely connecting the projection pattern 340. On the other hand, the lower limit of this formula (4) is determined to ensure that the following situation will not occur: Should this lower limit be exceeded, the refracting power of the negative cylindrical lens becomes too strong and causes the range of illumination by the LED element to become excessively wide, with the result that the illuminate of the projection pattern 340 drops as a whole, and the optical projection systems hence become unsuitable for the auto focus detection.

If the optical projection systems cannot be made into thin-walled systems in terms of the interval between the principal points of their lenses with respect to a meridional luminous flux, it is necessary to replace the angle ω of viewing the non-light-emitting portion 220 with an angle ω' of viewing from the principal point of the cylindrical lens 303 a projected image δ' of the non-light-emitting portion (210Z-210Y) of the LED1 projected by the projection lens 107, and the effective radius $y_L$ of the projection lens 107 with an effective radius $y_L'$ of the cylindrical lens 303. Similarly, the distance $S_O$ is replaced with $S_O'$. However, $S_O'$ is a distance from the principal point of the cylindrical lens to a projected image δ' formed by the object lens 107 of the non-light-emitting portion (210X-210Y) of the LED1. Accordingly, we have $$\omega' = \delta'/S_O' = y_1'/f_c, \text{ and}$$

$$0.3 < \left| \frac{\delta' \cdot f_c}{y_L' \cdot S_O'} \right| < 1$$

By adjusting the interval between the principal points of the optical projection systems 107, 303, it becomes possible to make variable the synthetic refracting power of the optical projection systems 107, 303. Consequently, it becomes possible to adjust the degree of divergence of the projected luminous flux.

Incidentally, Köhler illumination and critical illumination are available among conventional optical illumination systems. However, when projecting a brighter primary pattern, as in the case of the present invention, the quantity of light of the light source can be utilized more effectively in the case of the critical illumination system than in the case of the Köhler illumination system, and is therefore simpler in terms of arrangement and more advantageous. If the Kohler illumination system is employed for pattern projection of this type, a light source, a condensor lens, a chart having a transmissive-type stripe pattern, and a projection lens are necessary. When this chart is illuminated uniformly by the light from the light source by means of the condensor lens, the illuminance on the chart declines appreciably in comparison with that of the light source. Furthermore, since the pattern of this chart is of the transmissive type, the occurrence of a loss of the quantity of light transmitted resulting from this pattern is unavoidable. Meanwhile, if the critical illumination system such as that of the present invention is adopted, since the pattern per se of the light source is projected, it is possible to obtain a very bright projected image. At that time, from a light source arranged in one direction in a dispersed manner, an image of the light source which is dispersed in the same direction is only obtained. However, by inserting a cylindrical lens, it becomes possible to obtain a continuous and uniform projection pattern without causing much loss in the quantity of light.

Figure 12:
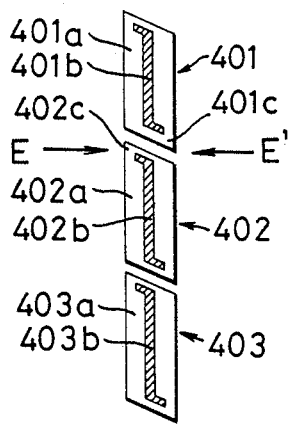
FIG. 12 is a further example of an improved device in accordance with the present invention.

An example of an improved LED chip which overcomes the drawback of the LED chip shown in FIG. 2B without using a cylindrical lens is shown in FIG. 12.

Each of the LED chips shown in FIG. 12 is a parallelogram, and an electrode 401b made of a metal film is formed in the shape of hook in the center of a LED chip 401. This electrode 401b is designed to ensure that an electric current will flow to every corner of the LED chip even if it is a parallelogram and that a uniform emission of light will be effected. Such an electrode extends in the longitudinal direction of each of the LED chips. Opposite ends thereof are bent at a fixed angle in such a manner that the opposite ends thereof will face the opposite directions. Since each of the LED chips has the shape of a parallelogram, no gap is created in the longitudinal direction of the projected image in the portion A—A' as in the case of the projected image shown in FIG. 2B. In other words, as shown in FIG. 12, for instance, a corner portion 401c of the LED chip 401 and a corner portion 402c of an LED chip 402 overlap each other at a portion E—E', so that the projected image from each of the LED chips will be connected continuously as bright and dark images in the direction perpendicular to the direction of the arrangement of the element array 106.

Accordingly, to eliminate the effect of the gap (A—A' in FIG. 2B) of the joint between the respective LED chips, as shown at E—E' in FIG. 12, the projection pattern 108 is arranged such that the tip of the electrode 401b and the tip of the electrode 402b (similarly, the tip of 402b and the tip of 403b) are disposed adjacent to each other. When an auto focusing operation using the auto focusing light device is effected since the object is dark, and even if the portion where the optical axis of the photographic lens 104 intersect the projection pattern 108 is the portion indicated by E—E', the projected images are formed continuously, so that it is possible to effect the auto focusing operation properly.

What we claim is:

1. An auto focusing light device detachably mounted on a camera which has a plurality of photoelectric conversion elements arranged in a unidimensional direction and detects the focusing condition of a photographic lens in accordance with the output of said plurality of photoelectric conversion elements, said device comprising:
    (a) a plurality of light-emitting elements arranged in a unidimensional direction; and
    (b) an optical projection system for projecting images of said plurality of light-emitting elements on an object in such a manner that the direction of arrangement of said images of said plurality of light-emitting elements is substantially perpendicular to the direction of arrangement of said plurality of photoelectric conversion elements.

2. An auto focusing light device according to claim 1, further comprising an optical conversion system for converting the light from said plurality of light-emitting elements in such a manner that the distribution of intensity of the light from said plurality of light-emitting elements in the direction on the object corresponding to the direction of arrangement of said plurality of light-emitting elements will vary continuously.

3. An auto focusing light device according to claim 2, wherein said optical conversion system is a cylindrical lens having a negative power.

4. An auto focusing light device according to claim 3, wherein said cylindrical lens has a negative power with respect to the direction substantially coinciding with the direction of arrangement of said plurality of light-emitting elements.

5. An auto focusing light device according to claim 1, wherein the direction of arrangement of said plurality of light-emitting elements is inclined relative to the plane perpendicular to the optical axis of said optical projection system.

6. An auto focusing light device according to claim 1, further comprising supplying means for supplying electric currents to said plurality of light-emitting elements, and wherein values of said electric currents are different each other, the intensity of light emitted by each of said plurality of light-emitting elements corresponds to the value of electric current supplied thereto.

7. An auto focusing light device according to claim 6, wherein said supplying means supplies electric currents to said plurality of light-emitting elements in such a manner that the values of electric currents respectively supplied to said plurality of light-emitting elements will increase in correspondence with the order of the arrangement of said plurality of light-emitting elements.

8. An auto focusing light device according to claim 1, further comprising flash means for flashing toward the object, driving means for driving said plurality of light-emitting elements, and control means for controlling said driving means.

9. An auto focusing light device according to claim 8, wherein said flash means includes capacitor means and means for charging said capacitor means, and said control means inhibits said driving means from driving said plurality of light-emitting elements until the amount of charge accumulated in said capacitor means reaches a predetermined value.

10. A camera system comprising:
(a) a photographic lens;
(b) focus detecting means for detecting the focusing condition of said photographic lens and having a plurality of photoelectric conversion elements arranged in a unidimensional direction, said plurality of photoelectric conversion elements detecting light from the object via said photographic lens;
(c) a plurality of light-emitting elements arranged in a unidimensional direction; and
(d) an optical projection system for projecting light from said plurality of light-emitting elements, the direction of distribution of light from said plurality of light-emitting elements on the object being perpendicular to the direction of arrangement of said plurality of photoelectric conversion elements relative to said photographic lens.

11. A camera system according to claim 10, wherein further comprising an optical conversion system for converting the light from said plurality of light-emitting elements in such a manner that the distribution of intensity of the light from said plurality of light-emitting elements in the direction on the object corresponding to the direction of arrangement of said plurality of light-emitting elements will vary continuously.

12. A camera system according to claim 11, wherein said optical conversion system is a cylindrical lens having a negative power.

13. A camera system according to claim 12, wherein said cylindrical lens has a negative power with respect to the direction substantially coinciding with the direction of arrangement of said plurality of light-emitting elements.

14. A camera system according to claim 10, wherein the direction of arrangement of said plurality of light-emitting elements is inclined relative to the plane perpendicular to the optical axis of said optical projection system.

15. A camera system according to claim 10, further comprising supplying means for supplying electric currents to said plurality of light-emitting elements, and wherein values of said electric currents are different each other, the intensity of light emitted by each of said plurality of light-emitting elements corresponds to the value of said electric currents supplied thereto.

16. A camera system according to claim 10, further comprising flash means for flashing toward the object, driving means for driving said plurality of light-emitting elements, and control means for controlling said driving means.

17. A camera system according to claim 16, wherein said flash means includes capacitor means and means for charging said capacitor means, and said control means inhibits said driving means from driving said plurality of light-emitting elements until the amount of charge accumulated in said capacitor means reaches a predetermined value.

18. A device comprising:
a plurality of light sources;
a projection lens having a negative refracting power; and
a cylindrical lens having a negative refracting power with respect to a luminous flux in the direction of arrangement of said plurality of light sources,
wherein images of said plurality of light sources obtained by components of the luminous flux passing through said cylindrical lens are virtual images, and said cylindrical lens converts images of said plurality of light sources projected by said projection lens into continuously connected projected images.

19. A device comprising according to claim 18, wherein said projection lens having said positive refracting power and said cylindrical lens having said negative refracting power satisfy the following conditions:

$$0.3 < \left| \frac{\delta \cdot f_c}{y_L \cdot S_0} \right| < 1 \qquad (4)$$

where
  $\delta$: interval of the non-light-emitting portions of the light source
  $f_c$: focal length of a negative cylindrical lens
  $S_O$: distance from the principal point of the projection lens to the light source
  $y_L$: effective radius of the projection lens.

20. A device detachably mounted on a camera which has focus detection means for receiving light from an object through a photographic lens and detecting a focus condition of said photographic lens, said device comprising:
(a) a light emitting part extended in a unidimensional direction for emitting light to the object; and
(b) an optical projection system for projecting an image of said light emitting part on an object;
said light emitting part being arranged so that the direction of extension of said light emitting part is inclined relative to a plane perpendicular to the optical axis of said optical projection system.

21. A camera system comprising:
(a) a photographic lens;

(b) focus detecting means for receiving light from an object and detecting a focusing condition of said photographic lens;
(c) a light emitting part extended in a unidimensional direction for emitting light to the object; and
(d) an optical projection system for projecting an image of said light emitting part on an object;
said light emitting part being arranged so that the direction of extension of said light emitting part is inclinned relative to a plane perpendicular to the optical axis of said optical projection system.

22. A device detachably mounted on a camera which has focus detection means for receiving light from an object through a photographic lens and detecting a focus condition of said photographic lens, said device comprising:
(a) a light emitting part extended in a unidimensional direction for emitting light to the object; and
(b) an optical projection system for projecting an image of said light emitting part on an object so that the direction of extension of the image of said light emitting part is inclined relative to a plane perpendicular to the optical axis of said optical projection system.

23. A camera system comprising:
(a) a photographic lens;
(b) focus detecting means for receiving light from an object and detecting a focusing condition of said photographic lens;
(c) a light emitting part extended in a unidimensional direction for emitting light to an object; and
(d) an optical projection system for projecting an image of said light emitting part to the object, so that the direction of extension of the image of said light emitting part is inclined relative to a plane perpendicular to the optical axis of said optical projection system.

24. An auto focusing light device detachably mounted on a camera which has focus detection means for receiving light from an object through a photographic lens and detecting a focusing condition of said photographic lens, said device comprising:
(a) a light emitting part extended unidimensionally for emitting light; and
(b) a projection optical system for projecting light from said light emitting part to an object and for forming a plurality of images conforming to said light emitting part so that said plurality of images are arranged along a direction crossing the direction in which each of said images extends.

25. An auto focusing light device according to claim 24, wherein said projection optical system has a prism member for forming said plurality of images conforming to said light emitting part.

26. A device detachably mounted on a camera which has focus detection means having a plurality of photoelectric conversion elements arranged unidimensionally along a predetermined direction and detecting a focusing condition of said photographic lens in accordance with the output of said plurality of photoelectric conversion elements, said device comprising:
(a) a light emitting part for emitting light; and
(b) projection optical means for projecting light from said light emitting part to an object and for forming a plurality of images conforming to said light emitting part so that plurality of images conforming to said light emitting part are arranged along a direction conforming to said predetermined direction.

27. A device according to claim 26, wherein said projection optical means has a prism member for forming said plurality of images conforming to said light emitting part.

28. A device according to claim 27, wherein said plurality of images conforming to said light emitting part are arranged along a direction which is substantially coincident to said predetermined direction.

* * * * *